(12) United States Patent
Chen et al.

(10) Patent No.: US 10,152,879 B2
(45) Date of Patent: Dec. 11, 2018

(54) METHOD, APPARATUS, AND SYSTEM FOR MONITORING MANUFACTURING EQUIPMENT

(71) Applicant: Industrial Technology Research Institute, Hsinchu (TW)

(72) Inventors: Te-Ming Chen, Taipei (TW); Sen-Chia Chang, Hsinchu (TW); Chien-Liang Lai, Xinfeng Township (TW); Chi-Ting Day, Chiayi (TW)

(73) Assignee: Industrial Technology Research Institute, Hsinchu (TW)

(\*) Notice: Subject to any disclaimer, the term of this patent is extended or adjusted under 35 U.S.C. 154(b) by 395 days.

(21) Appl. No.: 14/936,787

(22) Filed: Nov. 10, 2015

(65) Prior Publication Data
US 2017/0132910 A1    May 11, 2017

(51) Int. Cl.
| | |
|---|---|
| *G08B 29/00* | (2006.01) |
| *G08B 23/00* | (2006.01) |
| *G08B 1/00* | (2006.01) |
| *G08B 21/00* | (2006.01) |
| *G08B 3/00* | (2006.01) |
| *G08B 29/18* | (2006.01) |

(Continued)

(52) U.S. Cl.
CPC .......... *G08B 29/185* (2013.01); *G05B 23/00* (2013.01); *G08B 21/182* (2013.01)

(58) Field of Classification Search
None
See application file for complete search history.

(56) References Cited

U.S. PATENT DOCUMENTS

| | | | | |
|---|---|---|---|---|
| 3,576,485 A | \* | 4/1971 | Coons, Jr. .......... | H02H 7/0844 318/434 |
| 3,605,909 A | \* | 9/1971 | Lemelson .......... | G05B 19/401 173/19 |

(Continued)

FOREIGN PATENT DOCUMENTS

| | | |
|---|---|---|
| CN | 101263499 A | 9/2008 |
| CN | 103995229 A | 8/2014 |

(Continued)

OTHER PUBLICATIONS

Author: Moyne, Title: Deploying an Equipment Health Monitoring Dashboard and Assesing Predictive Maintenance, Date: Jul. 8, 2013. Pertinent Pages: Whole Document.\*

(Continued)

*Primary Examiner* — Steven Lim
*Assistant Examiner* — Muhammad Adnan
(74) *Attorney, Agent, or Firm* — Finnegan, Henderson, Farabow, Garrett & Dunner LLP

(57) ABSTRACT

A method for monitoring a manufacturing apparatus includes collecting a control signal, of a controller and a corresponding sensing signal, of the manufacturing apparatus over a predetermined period of time; segmenting the control signal and the corresponding sensing signal to obtain at least one control step; calculating a character of the controller based on at least one of the control signal, the sensing signal, the at least one control step, or information from a user manual; generating, based on the character, a health index indicating health of the controller; and generating a warning signal when the health index exceeds a predetermined threshold.

25 Claims, 17 Drawing Sheets

(51) Int. Cl.
*G08B 21/18* (2006.01)
*G05B 23/00* (2006.01)

(56) References Cited

U.S. PATENT DOCUMENTS

| | | | | |
|---|---|---|---|---|
| 4,992,964 | A * | 2/1991 | Sagara | G05B 19/4063 702/43 |
| 6,205,409 | B1 | 3/2001 | Zvonar | |
| 6,272,401 | B1 * | 8/2001 | Boger | F15B 5/006 700/282 |
| 6,326,758 | B1 * | 12/2001 | Discenzo | G05B 23/0243 318/432 |
| 6,466,893 | B1 * | 10/2002 | Latwesen | G05B 23/0202 700/282 |
| 6,629,009 | B1 * | 9/2003 | Tamaki | G05B 19/41875 700/108 |
| 6,655,408 | B2 | 12/2003 | Linthorst | |
| 6,725,167 | B2 | 4/2004 | Grumstrup et al. | |
| 7,010,376 | B2 * | 3/2006 | Ettaleb | G05B 23/024 700/110 |
| 7,062,411 | B2 | 6/2006 | Hopkins et al. | |
| 7,184,515 | B2 * | 2/2007 | Wilson | G01N 23/223 378/44 |
| 7,306,115 | B2 | 12/2007 | Beachy | |
| 7,523,011 | B2 * | 4/2009 | Akiyama | G06K 9/00516 702/119 |
| 7,809,473 | B2 | 10/2010 | Shajii et al. | |
| 7,882,394 | B2 | 2/2011 | Hosek et al. | |
| 8,041,542 | B2 | 10/2011 | Pearson | |
| 8,356,207 | B2 | 1/2013 | Hosek et al. | |
| 8,370,108 | B2 * | 2/2013 | Fujimaki | G06N 7/005 702/182 |
| 8,489,209 | B2 * | 7/2013 | Starr | G05B 23/0216 700/17 |
| 8,560,106 | B2 | 10/2013 | Swyers et al. | |
| 8,799,113 | B2 | 8/2014 | Markham et al. | |
| 8,812,306 | B2 * | 8/2014 | Kawashima | G10L 19/005 704/207 |
| 8,910,656 | B2 | 12/2014 | Yasuda | |
| 9,075,414 | B2 | 7/2015 | Takijiri | |
| 9,081,388 | B2 | 7/2015 | Tanaka et al. | |
| 9,276,622 | B2 * | 3/2016 | Liu | H04B 1/16 |
| 9,727,050 | B2 * | 8/2017 | Willis | G05B 19/4065 |
| 2001/0040324 | A1 * | 11/2001 | Mayama | F16F 15/02 267/136 |
| 2004/0158432 | A1 * | 8/2004 | King | G05B 23/0281 702/183 |
| 2005/0107962 | A1 * | 5/2005 | Zhan | G05B 23/0221 702/35 |
| 2005/0142987 | A1 * | 6/2005 | Kramer | B24B 37/042 451/5 |
| 2005/0194590 | A1 * | 9/2005 | Matsushita | G01R 31/2894 257/48 |
| 2007/0011520 | A1 * | 1/2007 | Ikeda | G01R 31/2882 714/724 |
| 2007/0038889 | A1 * | 2/2007 | Wiggins | G05B 23/0264 714/20 |
| 2007/0067142 | A1 * | 3/2007 | Kavaklioglu | G06F 3/0482 702/182 |
| 2007/0067678 | A1 * | 3/2007 | Hosek | G05B 23/0235 714/25 |
| 2009/0222124 | A1 * | 9/2009 | Latwesen | G05B 23/0235 700/110 |
| 2010/0161274 | A1 * | 6/2010 | Leao | G05B 23/0243 702/179 |
| 2011/0173496 | A1 | 7/2011 | Hosek et al. | |
| 2013/0080372 | A1 | 3/2013 | Ho et al. | |
| 2013/0173042 | A1 * | 7/2013 | Morisawa | G05B 19/4184 700/121 |
| 2013/0188046 | A1 * | 7/2013 | Kong | G08B 21/18 348/143 |
| 2014/0055274 | A1 * | 2/2014 | Hatch | G01H 1/00 340/679 |
| 2014/0095016 | A1 * | 4/2014 | Suganuma | G07C 5/00 701/32.1 |
| 2014/0114611 | A1 | 4/2014 | Moyne et al. | |
| 2014/0368340 | A1 | 12/2014 | Jerzak et al. | |
| 2015/0220847 | A1 * | 8/2015 | Shibuya | G06N 5/047 706/12 |
| 2015/0237765 | A1 * | 8/2015 | Liu | H05K 7/20209 700/275 |
| 2015/0278711 | A1 * | 10/2015 | Angelov | G05B 23/024 706/12 |
| 2016/0012651 | A1 * | 1/2016 | Mouterde | G07C 5/08 701/32.9 |
| 2016/0326726 | A1 * | 11/2016 | Koga | E02F 9/2054 |

FOREIGN PATENT DOCUMENTS

| | | |
|---|---|---|
| TW | I247228 B | 1/2006 |
| TW | I450063 | 10/2008 |
| TW | I435233 | 4/2014 |

OTHER PUBLICATIONS

Moyne et al., "Deploying an Equipment Health Monitoring Dashboard and Assessing Predictive Maintenance", IEEE, ASMC 2013, pp. 105-110.

Moyne et al., "Leveraging Advanced Process Control (APC) Technology in Developing Predictive Maintenance (PdM) Systems", IEEE, ASMC 2012, pp. 221-226.

Lee et al., "Development of a Predictive and Preventive Maintenance Demonstration System for a Semiconductor Etching Tool", ECF Transactions 52(1), 2013, pp. 913-927.

Chang et al., "Spatiotemporal Pattern Modeling for Fault Detection and Classification in Semiconductor Manufacturing", IEEE Transactions on Semiconductor Manufacturing, vol. 25, No. 1, Feb. 2012, pp. 72-82.

Bleakie et al., "Feature extraction, condition monitoring, and fault modeling in semiconductor manufacturing systems", Computers in Industry 64 (2013), pp. 203-213.

\* cited by examiner

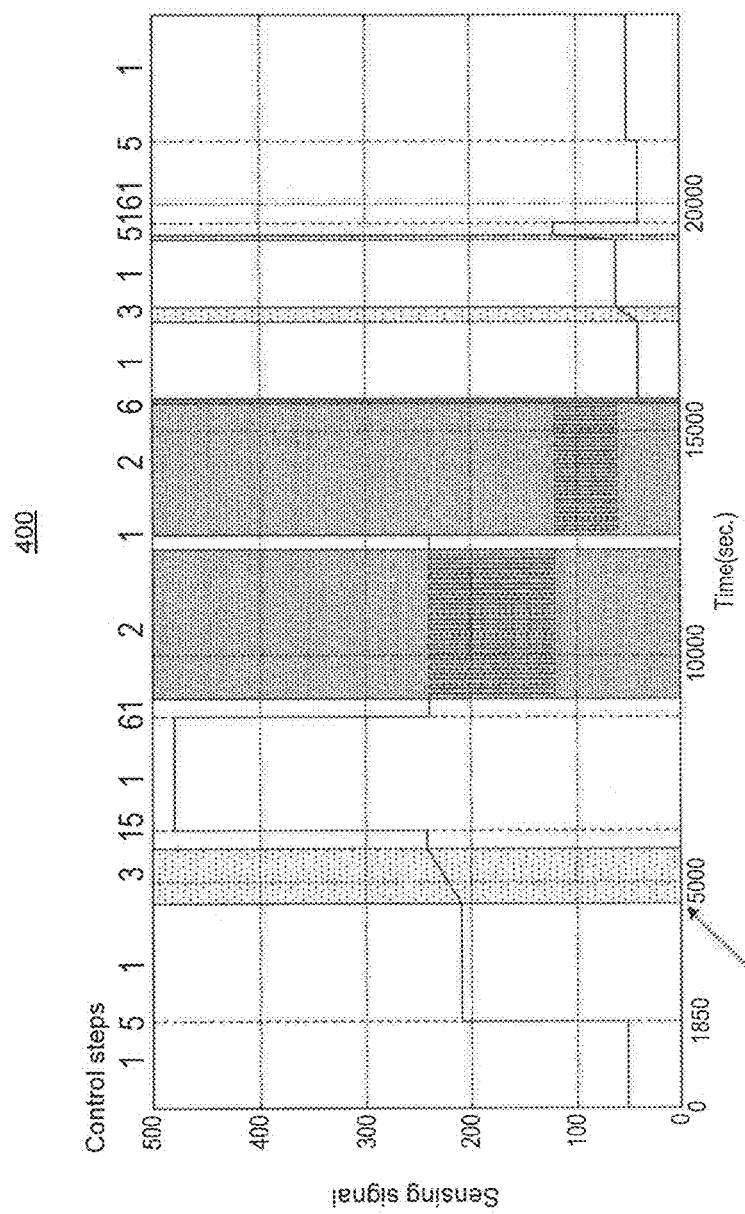

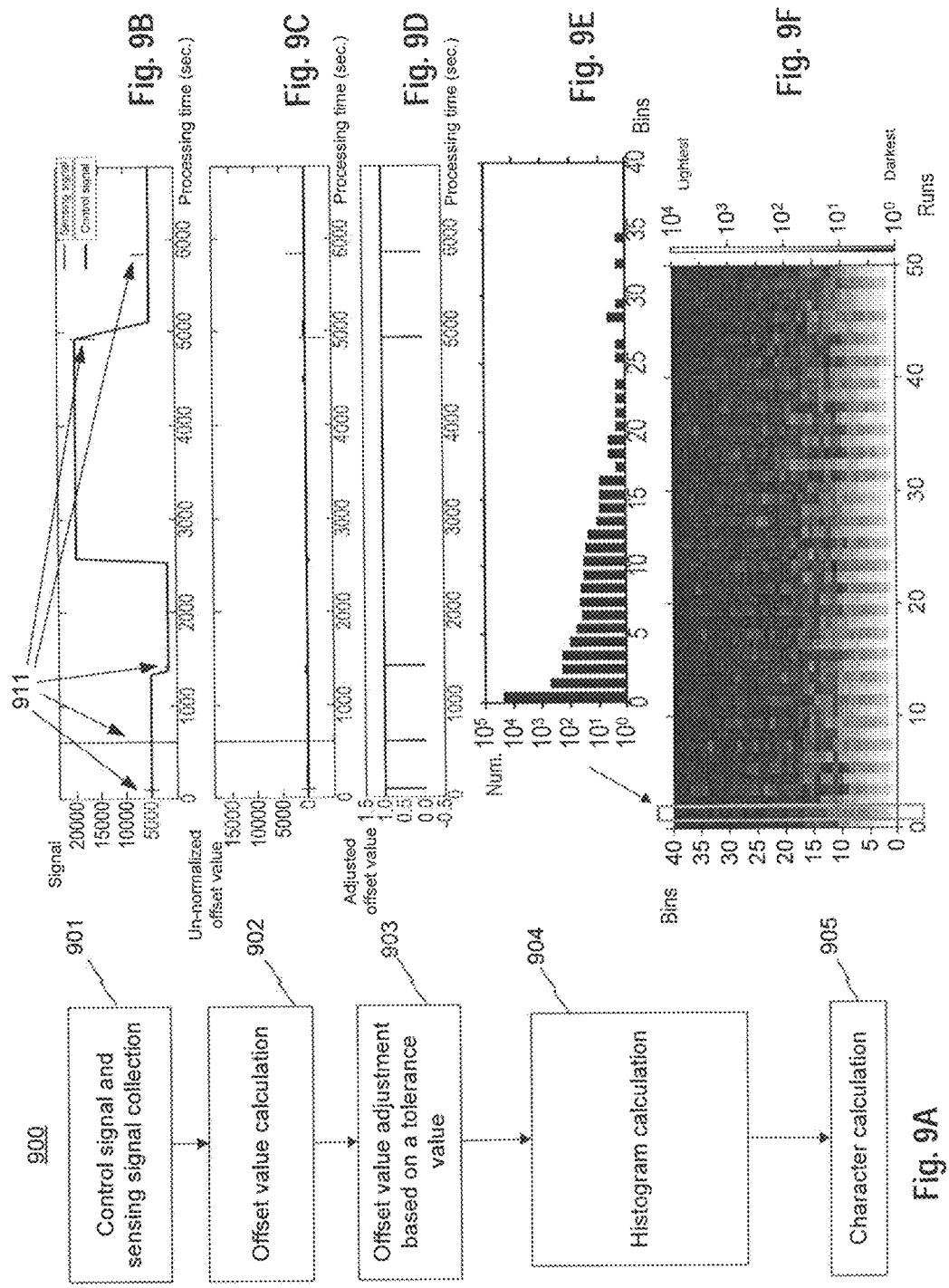

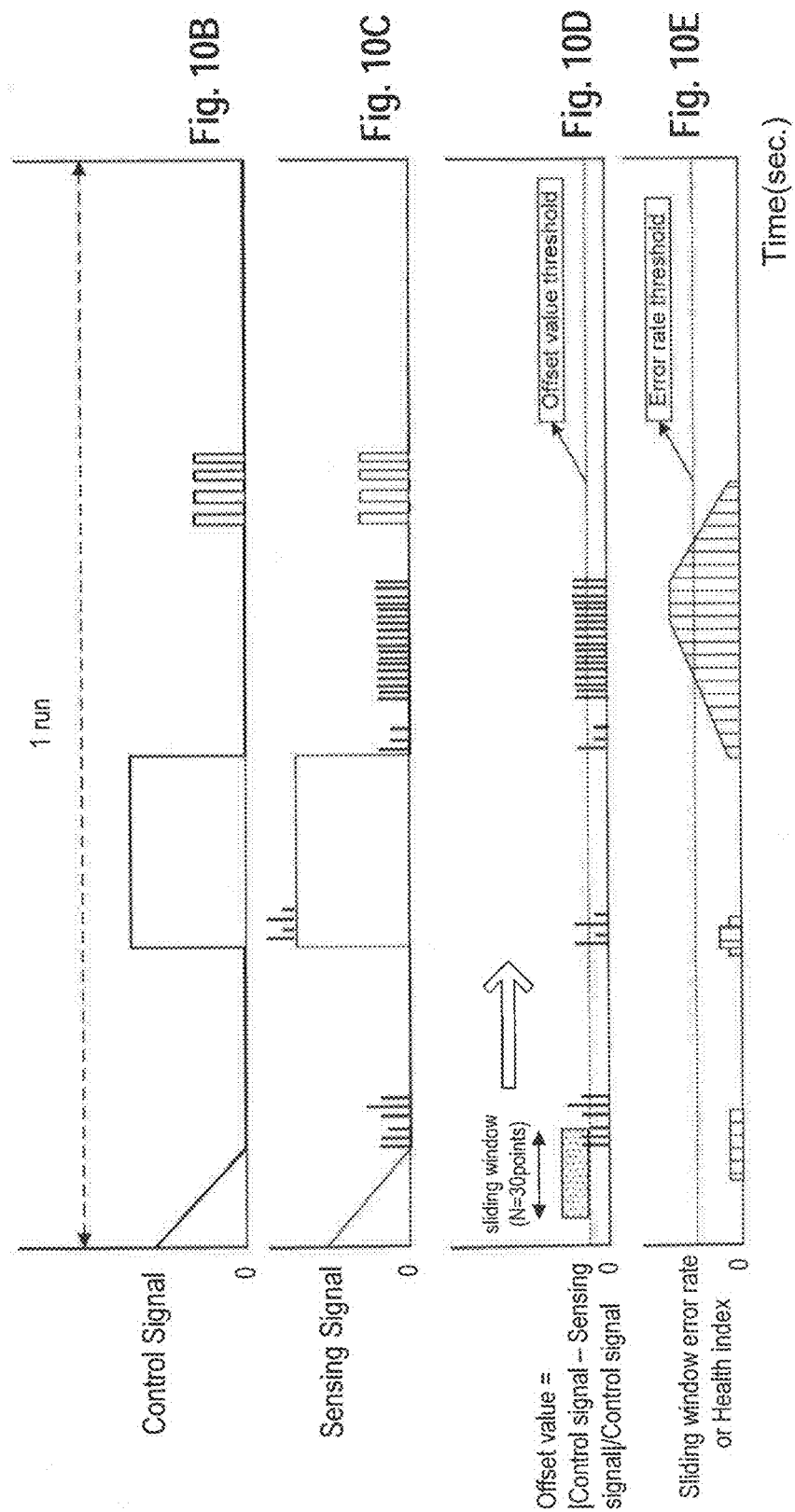

METHOD, APPARATUS, AND SYSTEM FOR MONITORING MANUFACTURING EQUIPMENT

TECHNICAL FIELD

The present application relates to methods, apparatus, and systems for monitoring manufacturing equipment.

BACKGROUND

Equipment breakdown can pose a serious problem to manufacturing companies, including companies in the electronics/optoelectronics industry. Considering global market values and competition, companies wish to avoid falling behind in production because of equipment breakdown.

Successful companies usually mitigate the risk of equipment breakdown by actively investing in equipment maintenance and management to ensure a high level of productivity. This involves equipment monitoring and status evaluation, down to a component level. Based on the results of such monitoring and evaluation, companies may make informed decisions to carry out timely maintenance, that obviate the need for in-production shut downs.

With respect to the electronics/optoelectronics industry, manufacturing equipment includes, for example, Chemical Vapor Deposition (CVD) machines and Metal Organic Chemical Vapor Deposition (MOCVD) machines, which in turn include controllers. The controllers may control movement of materials including reactants, precursors, or products, in a pipeline network. Controller malfunction may cause lower yield, if not an entire wasted production.

Existing maintenance practices, however, cannot fulfil the demand for accurate controller monitoring. For example, some controller monitoring methods may transmit false alarms or fail to detect problems.

SUMMARY

One aspect of the present disclosure is directed to a method for monitoring a manufacturing apparatus. The method includes collecting a control signal, of a controller and a corresponding sensing signal, of the manufacturing apparatus over a predetermined period of time; segmenting the control signal and the corresponding sensing signal to obtain at least one control step; calculating a character of the controller based on at least one of the control signal, the sensing signal, the at least one control step, or information from a user manual; generating, based on the character, a health index indicating health of the controller; and generating a warning signal when the health index exceeds a predetermined threshold.

Another aspect of the present disclosure is directed to a manufacturing system. The system includes a manufacturing apparatus and a monitoring apparatus. The manufacturing apparatus includes a controller. The monitoring apparatus includes a processor and a memory storing instructions. The instructions, when executed by the processor, cause the processor to: collect a control signal of the controller, and a corresponding sensing signal, over a predetermined period of time; segment the control signal and the corresponding sensing signal to obtain at least one control step; calculate a character of the controller based on at least one of the control signal, the sensing signal, the at least one control step, or information from a user manual; generate, based on the character, a health index indicating health of the controller; and generate a warning signal when the health index exceeds a predetermined threshold.

Another aspect of the present disclosure is directed to an apparatus for monitoring a manufacturing apparatus. The apparatus includes a processor and a memory storing instructions. The instructions, when executed by the processor, cause the processor to: collect a control signal of a controller, and a corresponding sensing signal, of the manufacturing apparatus over a predetermined period of time; segment the control signal and the corresponding sensing signal to obtain at least one control step; calculate a character of the controller based on at least one of the control signal, the sensing signal, the at least one control step, or information from a user manual; generate, based on the character, a health index indicating health of the controller; and generate a warning signal when the health index exceeds a predetermined threshold.

Another aspect of the present disclosure is directed to a non-transitory computer-readable storage medium embodying a computer program product. The computer program product includes instructions configured to cause a computing device to perform a method. The method includes collecting a control signal of a controller, and a corresponding sensing signal, of a manufacturing apparatus over a predetermined period of time; segmenting the control signal and the corresponding sensing signal to obtain at least one control step; calculating a character of the controller based on at least one of the control signal, the sensing signal, the at least one control step, or information from a user manual; generating, based on the character, a health index indicating health of the controller; and generating a warning signal when the health index exceeds a predetermined threshold.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

FIG. 4A is a graphical representation of a method for segmenting/categorizing a sensing signal, and FIG. 4B illustrates categories of sensing signal change, according to an exemplary embodiment.

FIG. 9A is a flow diagram illustrating another method for calculating a character, and FIGS. 9B-9F are graphical representations of the method for calculating a character, according to an exemplary embodiment.

FIGS. 10B-10E are graphical representations of a method for determining a health index, according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
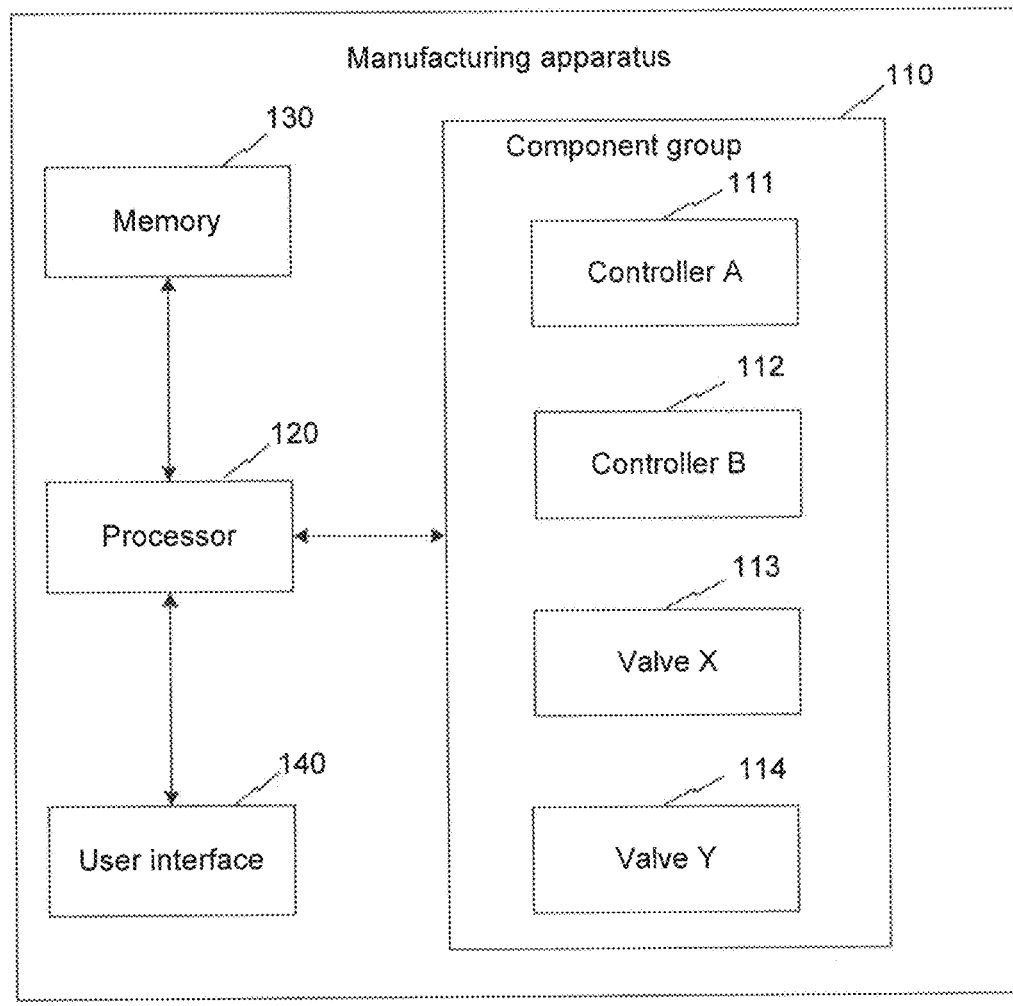
FIG. 1 is a block diagram illustrating a manufacturing apparatus, according to an exemplary embodiment.

FIG. 1 is a block diagram illustrating a manufacturing apparatus 100, according to an exemplary embodiment. The manufacturing apparatus 100 includes several components. Some components may be optional. The manufacturing apparatus 100 is configured to monitor itself.

In one embodiment, the manufacturing apparatus 100 includes a component group 110, a processor 120, a memory 130, e.g. a non-transitory computer-readable storage medium for storing instructions, and a user interface 140. The component group 110 includes controller A 111, controller B 112, valve X 113, and valve Y 114. The component group 110 may include greater or fewer numbers of controllers or valves. Each controller may be, for example, a liquid/gas mass flow controller, a temperature controller, a pressure controller, or a combined controller controlling temperature and pressure.

In some embodiments, the controller A 111, the controller B 112, the valve X 113, and the valve Y 114 are independent of each other.

In some embodiments, the controller A 111, the controller B 112, the valve X 113, and the valve Y 114 are connected in a network. The connections among the controllers and valves may be, for example, pipes in which a liquid/gas phase material flows. The connections may have many different configurations. In one example, a valve may function as a one-way switch in a pipe that permits or blocks materials flowing through the valve. In another example, the valve may also function as a multi-switch by selecting a pipe into which materials can flow. A valve is associated with a controller if they can be connected by a pipeline.

In some embodiments, the processor 120 communicates with the component group 110, the memory 130, and the user interface 140. The instructions stored in the memory 130, when executed by the processor 120, causes the processor 120 to perform a method, which will be described below with reference to FIG. 3. The user interface 140 may display a warning message. An example of the interface 140 displaying the warning message is described below with reference to FIG. 12.

Figure 2:
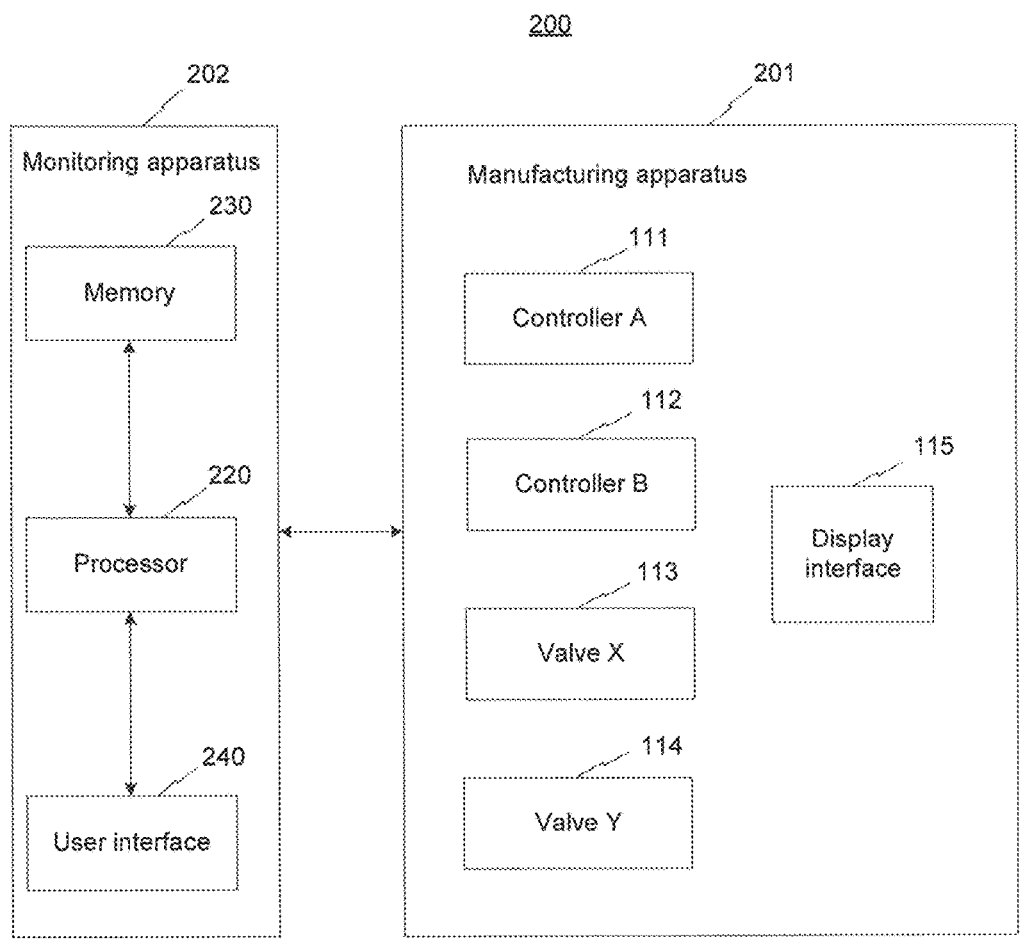
FIG. 2 is a block diagram illustrating a manufacturing system, according to an exemplary embodiment.

FIG. 2 is a block diagram illustrating a manufacturing system 200, according to an exemplary embodiment. The system 200 includes a manufacturing apparatus 201 and a monitoring apparatus 202. The manufacturing apparatus 201 and the monitoring apparatus 202 each include several components. Some components may be optional. The monitoring apparatus 202 is configured to monitor the manufacturing apparatus 201.

In one embodiment, the manufacturing apparatus 201 includes controller A 111, controller B 112, valve X 113, valve Y 114, and a display interface 115. The manufacturing apparatus 201 may include greater or fewer numbers of controllers or valves, as described above.

As noted above, in some embodiments, the controller A 111, the controller B 112, the valve X 113, and the valve Y 114 may be independent of each other.

In manufacturing apparatus 201, the controller A 111, the controller B 112, the valve X 113, and the valve Y 114 are connected in a network. The connections among the controllers and valves may be, for example, pipes in which a liquid/gas phase material flows. The connections may have many different configurations. In one example, a valve may function as a one-way switch in a pipe that permits or blocks materials flowing through the valve. In another example, the valve may also function as a multi-switch by selecting a pipe into which materials can flow. A valve is associated with a controller if they can be connected by a pipeline.

In some embodiments, the monitoring apparatus 202 includes a processor 220, a memory 230, e.g. a non-transitory computer-readable storage medium for storing instructions, and a user interface 240. The monitoring apparatus 202 communicates with the manufacturing apparatus 201. The instructions stored in the memory 230, when executed by the processor 220, causes the processor 220 to perform a method, which will be described below with reference to FIG. 3. The user interface 240 and the display interface 115 may each display a warning message. An example of either interface 115 or 240 displaying the warning message is described below with reference to FIG. 12.

Figure 3A:
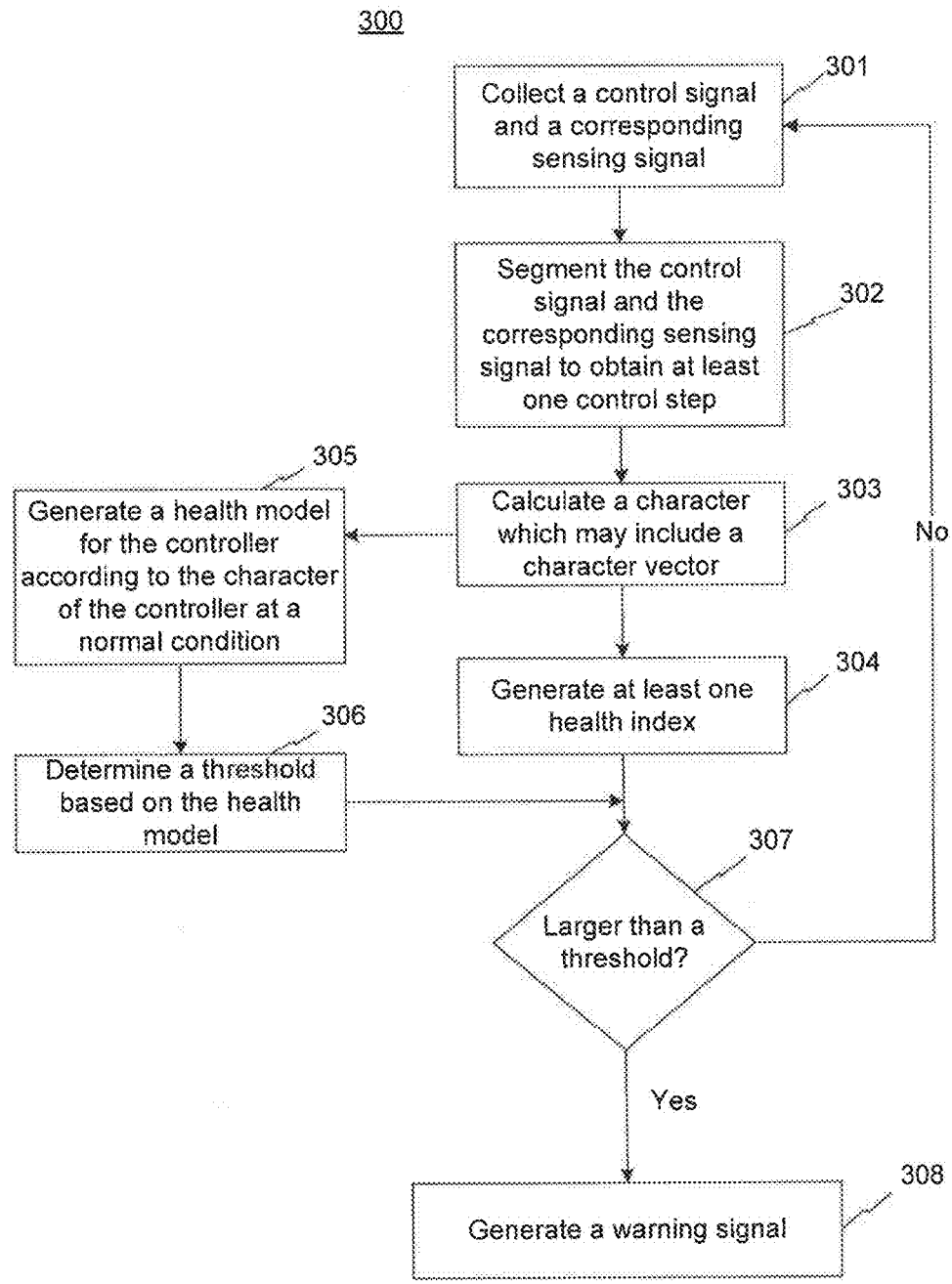
FIG. 3A is a flow diagram illustrating a method for monitoring a manufacturing apparatus, according to an exemplary embodiment.

FIG. 3A is a flow diagram illustrating a method 300 for monitoring a manufacturing apparatus, according to an exemplary embodiment. The method 300 includes a series of steps, some of which may be optional. Some steps, such as step 301 may be performed continuously. Some steps may be performed simultaneously, for example, step 301 being performed while any other step is being performed. The steps of method 300 may be performed by the processor 120 of the manufacturing apparatus 100 or the processor 220 of the monitoring apparatus 202.

In some embodiments, a non-transitory computer-readable storage medium may embody a computer program product and the computer program product may include instructions configured to cause a computing device to perform the method 300.

At step 301, the processor, i.e. the processor 120 or the processor 220, collects a control signal, of a controller and a corresponding sensing signal, of the manufacturing apparatus, i.e., the manufacturing apparatus 100 or the manufacturing apparatus 201 over a predetermined period of time. The control signal may, for example, be a signal generated by the manufacturing apparatus and received by the controller according to a recipe input to the manufacturing apparatus. As used herein, the term recipe refers to a set of instructions input to a manufacturing apparatus to specify fabrication processes to make a product. The recipe may be input by a user to the manufacturing apparatus and include manufacturing steps. The sensing signal may be a signal generated by a sensor associated with the controller and reflecting a real-time measurement. The control signal and the sensing signal may have a corresponding relationship. The control signal and the corresponding sensing signal may indicate a physical quantity of a material and may be time-dependent. In one example, according to a recipe input, a control signal sent to a mass flow controller controls the mass flow controller to control a mass flow to be 1 L/s for 10 s. In response, the mass flow controller is assumed to flow a material at a theoretical rate of 1 L/s for 10 s. However, according to a real-time measurement by a mass flow sensor associated with the controller, a sensing signal indicates a real flow rate of 0.95 L/s for 10 s. Thus, in this manner, the control signal and the sensing signal each represent a process parameter and have a corresponding relationship.

At step 302, the processor segments the control signal and the corresponding sensing signal to obtain at least one control step. An example of such segmentation is described below with reference to FIG. 4. In some embodiments, the segmentation is based on time period segmentation to obtain the at least one control step. Each control step corresponds to a segmented control signal and a segmented sensing signal.

At step 303, the processor calculates a character of the controller based on at least one of the control signal, the sensing signal, the at least one control step, or information from a user manual. An example of such calculation is described below with reference to FIGS. 9A-9F. The character is a parameter quantitatively indicating a status of the controller. In some embodiments, the character includes a character vector, which is a vector quantitatively indicating a status of the controller. The user manual may be a user manual of the manufacturing apparatus and carry information about the controller. The information from the user manual may, for example, include rise time, fall time, overshoot, and undershoot of the controller. The information, from the user manual, may also include physical measurements made by experts or a producer of the manufacturing apparatus. An example of the operation of the step 303 is described below with reference to FIG. 5A.

At step 304, the processor generates, based on the character, a health index indicating health of the controller. In the present embodiment, the health index has a numerical value. In one embodiment, the processor transforms the character into a single health index to represent a health status of the controller. In one example, the processor uses a scoring function or transformation to transform the character vector to a numerical/discrete value (e.g. 1, 2, or 3), which represents a categorical state (e.g. healthy, degraded, or failure).

Further examples of the operation of the step 304 are described below with reference to FIGS. 10A-10E.

At step 305, the processor generates a health model for the controller according to the character of the controller in a normal condition. The health model can be, for example, a mathematical model indicating a status of the manufacturing apparatus. In some embodiment, generating the health model includes generating the health model based on a self-organizing map (SOM), a restricted Boltzmann machine (RBM), a deep neural network (DNN), an autoencoder, a convolutional RBM, a convolutional DNN, a Hotelling's T-squared statistic, a Q-statistic, a one-class classifier, one-class support vector machine, a support vector data description (SVDD), a fuzzy c-means, a Gaussian mixture model (GMM), a k nearest neighbors (kNN), or a sliding window error rate. The normal condition includes a condition in which the manufacturing apparatus functions normally.

At step 306, the processor determines a threshold based on the health model. In the present embodiment, the threshold has a numerical value.

At step 307, the processor compares the health index with the threshold determined in step 306 or compares a difference between a current character and a character in a normal condition to the determined threshold. The difference may include a Mahalanobis distance or a Euclidean distance. In some embodiments, if the health index exceeds the threshold, the method proceeds to step 308. If the health index does not exceed the threshold, the processor continues to collect a control signal and a corresponding sensing signal (step 301).

At step 308, the processor generates a warning signal. In some embodiments, the warning signal includes at least one of a first health index indicating the health of the controller at a past time, a second health index indicating the health of the controller at a current time, the control signal and the sensing signal of the controller, or an offset value described below with reference to FIG. 5A.

In some embodiments, the processor generates a warning message based on the warning signal. In one example with reference to FIG. 1, the processor 120 displays the warning message on the user interface 140. In another example with reference to FIG. 2, the manufacturing apparatus 201 displays the warning message on the display interface 115. In yet another example with reference to FIG. 2, the manufacturing apparatus 201 transmits the warning signal to the monitoring apparatus 202 and the processor 220 displays the warning message on the user interface 240.

Figure 3B:
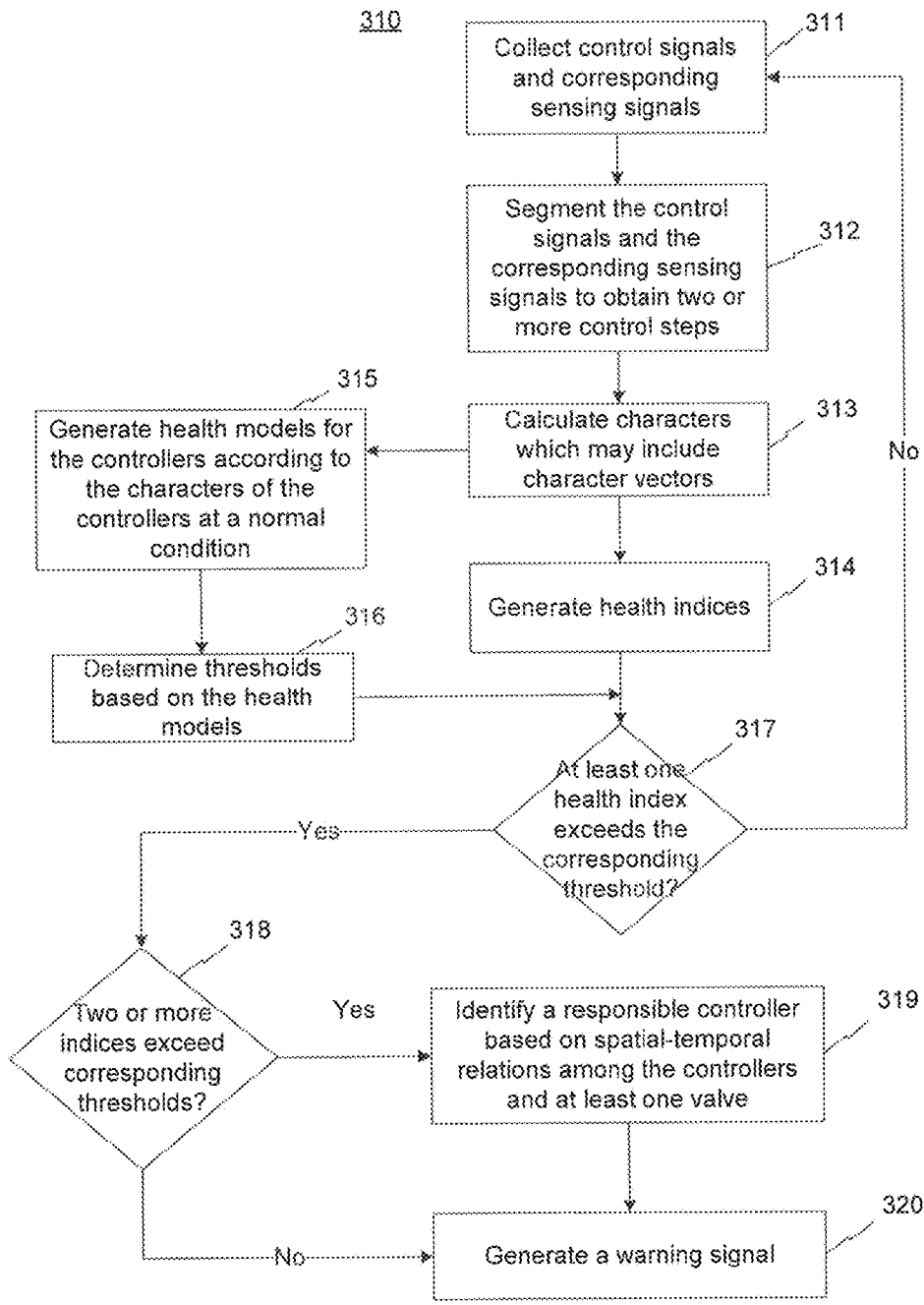
FIG. 3B is a flow diagram illustrating another method for monitoring a manufacturing apparatus, according to an exemplary embodiment.

FIG. 3B is a flow diagram illustrating a method 310 for monitoring a manufacturing apparatus, according to an exemplary embodiment. The method 310 includes a series of steps, some of which may be optional. Some steps, such as step 311 may be performed continuously. Some steps may be performed simultaneously, for example, step 311 being performed while any other step is being performed. The steps of method 310 may be performed by the processor 120 of the manufacturing apparatus 100 or the processor 220 of the monitoring apparatus 202.

In some embodiments, a non-transitory computer-readable storage medium may embody a computer program product and the computer program product may include instructions configured to cause a computing device to perform the method 310.

At step 311, the processor, i.e. the processor 120 or the processor 220, collects control signals and corresponding sensing signals of a plurality of controllers of the manufacturing apparatus, i.e., the manufacturing apparatus 100 or the manufacturing apparatus 201 over a predetermined period of time. In some embodiments, at least one valve, i.e. the valve X 113 or the valve Y 114, is associated with the plurality of controllers.

At step 312, the processor segments the control signals and the corresponding sensing signals to obtain two or more control steps. In some embodiments, the segmentation is based on time period segmentation to obtain the two or more control steps. Each control step corresponds to a segmented control signal and a segmented sensing signal.

At step 313, the processor correspondingly calculates characters of the controllers based on at least one of the control signals, the sensing signals, the two or more control steps, or information from a user manual. An example of such calculation is described below with reference to FIGS. 9A-9F. As described above, the user manual may be a user manual of the manufacturing apparatus and carry information about the controllers/valves. An example of the operation of the step 313 is described below with reference to FIG. 5B.

At step 314, the processor generates, based on the characters, health indices correspondingly indicating health of the controllers. In the present embodiment, the health indices have numerical values. Examples of the operation of the step 314 are described below with reference to FIGS. 10A-10E.

At step 315, the processor correspondingly generates health models for the controllers according to the characters of the controllers in normal conditions. As described above, the health models can be, for example, mathematical models indicating status of the manufacturing apparatus.

At step 316, the processor correspondingly determines thresholds based on the health models. In the present embodiment, the thresholds have numerical values.

At step 317, the processor correspondingly compares the health indices with the thresholds determined in step 316 or correspondingly compares differences between current characters and characters in a normal condition to the determined thresholds. The differences may include a Mahalanobis distance or a Euclidean distance. In some embodiments, if at least one of the health indices exceeds the corresponding threshold, the method proceeds to step 318. Otherwise, the processor continues to collect a control signal and a corresponding sensing signal (step 311).

At step 318, the processor determines if two or more health indices exceed the corresponding thresholds. If two or more health indices exceed the corresponding thresholds, the method proceeds to step 319. Otherwise, the method proceeds to step 320.

At step 319, the processor identifies a responsible controller based on spatial-temporal relations among the controllers and the at least one valve. An example of the operation of step 319 is described below in reference to FIGS. 11A-11C.

In some embodiments, the spatial-temporal relations include relative positions of the controllers and the at least one valve in the network of connected pipes, with respect to flow directions of materials and closing/opening time of the at least one valve.

In some embodiments, identifying the responsible controller includes identifying one of the controllers that causes at least one other controller to have at least one health index exceeding a corresponding predetermined threshold.

In some embodiments, identifying the responsible controller is based on a multivariable analysis. The multivariable analysis includes analyzing a plurality of variables that may cause changes to a result. The multivariable analysis further includes varying a variable while keeping all other variables constant and identifying a variable that can cause most changes to the result.

At step 320, the processor generates a warning signal. In some embodiments, the warning signal includes at least one of a first health index indicating the health of the responsible controller at a past time, a second health index indicating the health of the responsible controller at a current time, the control signal and the sensing signal of the responsible controller, the offset values described below with reference to FIG. 5B, or a temporal and spatial event analysis result among the plurality of controllers including the responsible controller and the at least one valve described below with reference to FIGS. 11A-11C.

In some embodiments, the processor generates a warning message based on the warning signal. In one example with reference to FIG. 1, the processor 120 displays the warning message on the user interface 140. In another example with reference to FIG. 2, the manufacturing apparatus 201 displays the warning message on the display interface 115. In yet another example with reference to FIG. 2, the manufacturing apparatus 201 transmits the warning signal to the monitoring apparatus 202 and the processor 220 displays the warning message on the user interface 240.

FIG. 4A is a graphical representation of a method 400 for segmenting/categorizing a control signal, according to an exemplary embodiment.

In FIG. 4A, the magnitude (in arbitrary units) of a sensing signal is represented on the y-axis and time (in seconds) is represented on the x-axis. In this exemplary embodiment, the sensing signal is a measurement of a physical quantity. Rates of change of the sensing signal with respect to time are recorded and categorized. Vertical dashed lines are used to segment areas of different rates of change of the sensing signal with respect to time and corresponding category labels are added at the top of the graphical representation.

FIG. 4B illustrates various exemplary categories of change of the control signal. In one embodiment, the categories include steady (no change), oscillation, slow rise, slow drop, sharp rise, and sharp drop. An arbitrary threshold rate of change may be chosen to differentiate between "slow" and "sharp."

In one example, the x-axis can be segmented according to the categories to obtain control steps. A control step includes a time period segment. Each category may thus include one or more control steps. For example, in a first segment, the sensing signal in FIG. 4A starts at about 50 at 0s and stays at 50 until about 1850s. This segment corresponds to category 1 (steady) in FIG. 4B. Then, in a second segment at about 1850s, the sensing signal rises from about 50 to about 210, corresponding to category 5 (sharp rise) in FIG. 4B. In a third segment, the sensing signal stays at about 210 from 1850s to 4600s, corresponding again to category 1 (steady) in FIG. 4B.

Figure 5A:
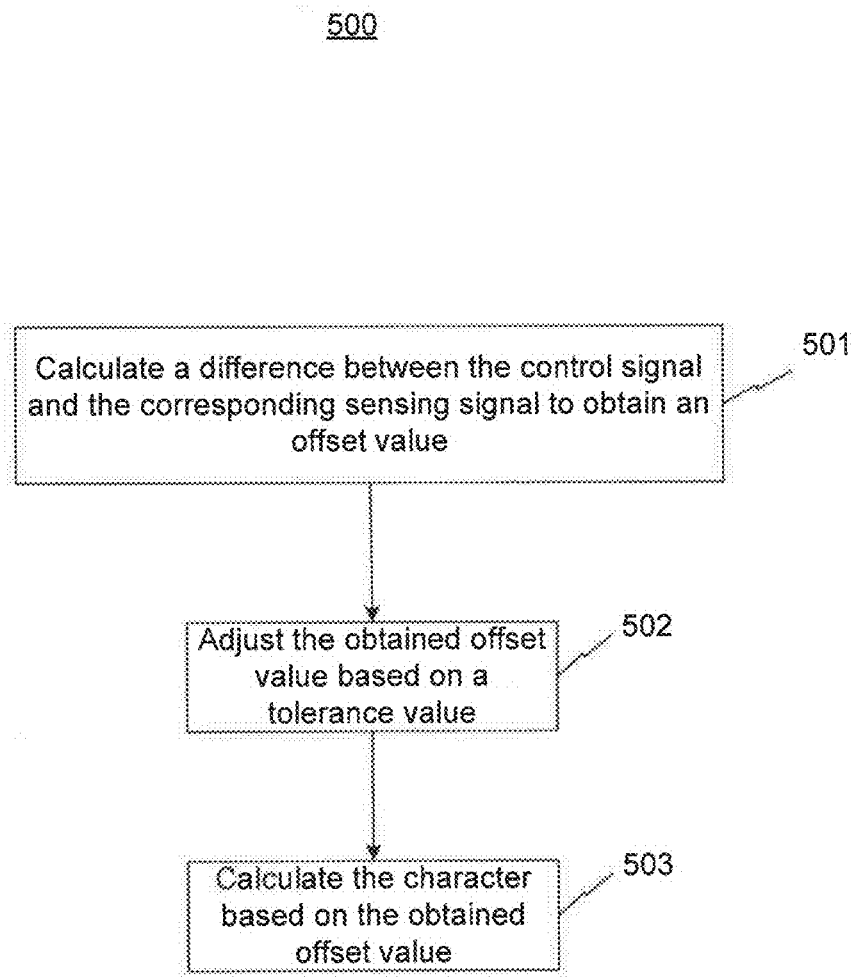
FIG. 5A is a flow diagram illustrating a method for calculating a character, according to an exemplary embodiment.

FIG. 5A is a flow diagram illustrating a method 500 for calculating a character, according to an exemplary embodiment. The method 500 includes a series of steps, some of which may be optional. The steps of method 500 may be performed by the processor 120 of the manufacturing apparatus 100 or the processor 220 of the monitoring apparatus 202.

At step 501, the processor calculates a difference between the control signal and the corresponding sensing signal to obtain an offset value. The difference may include an absolute difference or a percentage difference. In one example, the offset value is calculated by the following formula.

$$\text{Offset Value} = \frac{|\text{Control Signal} - \text{Sensing Signal}|}{\text{Control Signal}}$$

At step 502, the processor adjusts the obtained offset value based on a tolerance value. The tolerance value will be described below with reference to FIG. 6.

At step 503, the processor calculates the character based on the obtained offset value. The character includes the character vector. The calculation may include calculating a histogram, a mean, a standard deviation, a maximum value, a minimum value, a range, an interquartile range, a skewness, a kurtosis, a rise time, a fall time, a settling time, an overshoot, an undershoot, or a time to peak. An example of the operation of the step 503 is described below with reference to FIG. 7.

Figure 5B:
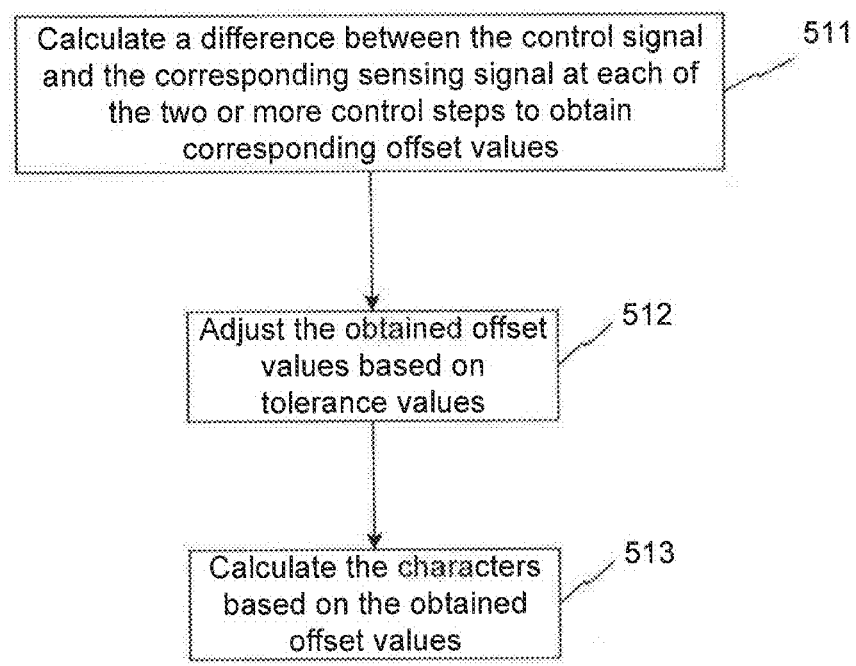
FIG. 5B is a flow diagram illustrating another method for calculating a character, according to an exemplary embodiment.

FIG. 5B is a flow diagram illustrating another method 510 for calculating a character, according to an exemplary embodiment. The steps of method 510 may be performed by the processor 120 of the manufacturing apparatus 100 or the processor 220 of the monitoring apparatus 202.

At step 511, the processor correspondingly calculates a difference between the control signal and the corresponding sensing signal at each of the two or more control steps to obtain corresponding offset values. The difference may include an absolute difference or a percentage difference. In one example, each of the offset values is correspondingly calculated by the following formula.

$$\text{Offset Value} = \frac{|\text{Control Signal} - \text{Sensing Signal}|}{\text{Control Signal}}$$

At step 512, the processor correspondingly adjusts the obtained offset values based on tolerance values. The tolerance values will be described below with reference to FIG. 6.

At step 513, the processor correspondingly calculates the characters based on the obtained offset values. The characters correspondingly include character vectors. An example of the operation of the step 513 is described below with reference to FIG. 8.

Figure 6:
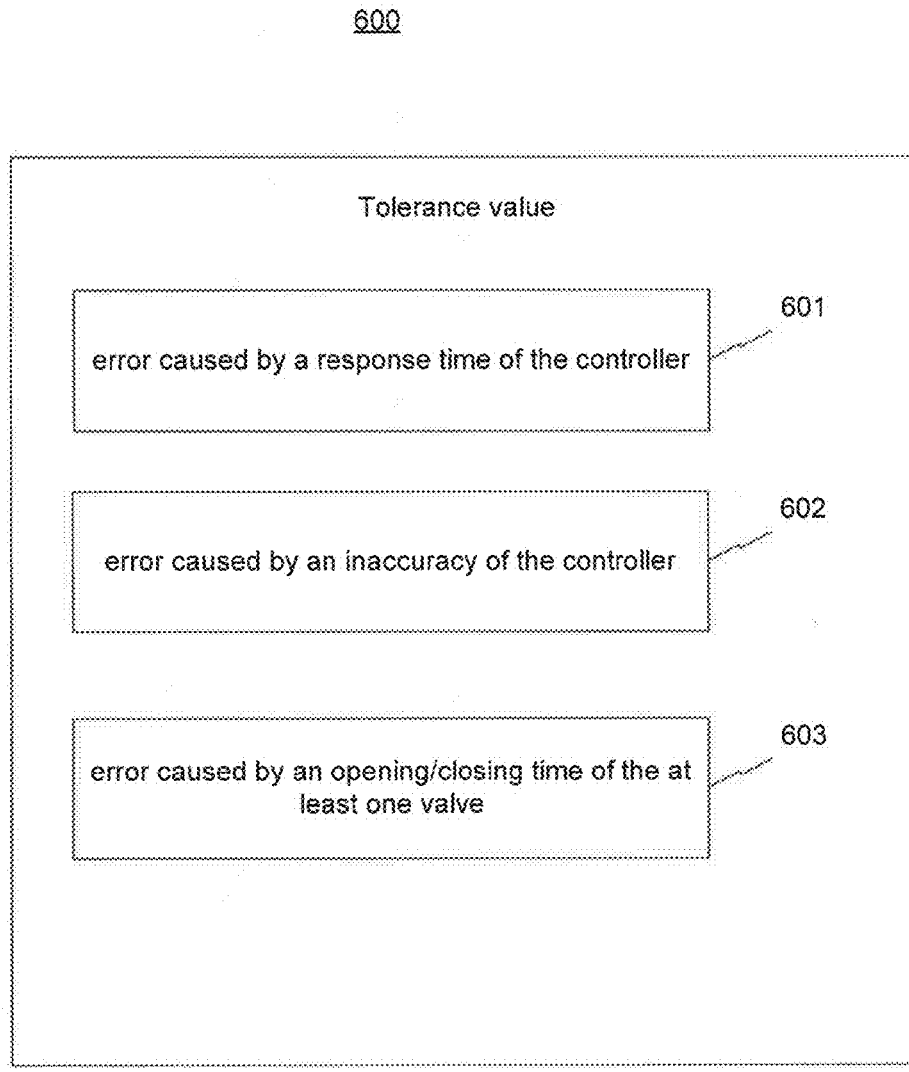
FIG. 6 is a block diagram illustrating a tolerance value, according to an exemplary embodiment.

FIG. 6 is a block diagram illustrating a tolerance value 600, according to an exemplary embodiment. The tolerance value 600 may be pre-defined by a user and be input by the user at the user interface 140 or the user interface 240. The tolerance value may, for example, include error caused by at least one of a response time of the controller 601, an inaccuracy of the controller 602, or an opening/closing time of the at least one valve 603. In this embodiment, the at least one valve refers to the at least one valve described in step 319 in FIG. 3B.

In one example, the user may know that a particular controller has a response time of 0.5 seconds, and input this as the tolerance value. Accordingly, step 502 in FIG. 5A or step 512 in FIG. 5B would include adjusting the offset value by 0.5 seconds.

Figure 7:
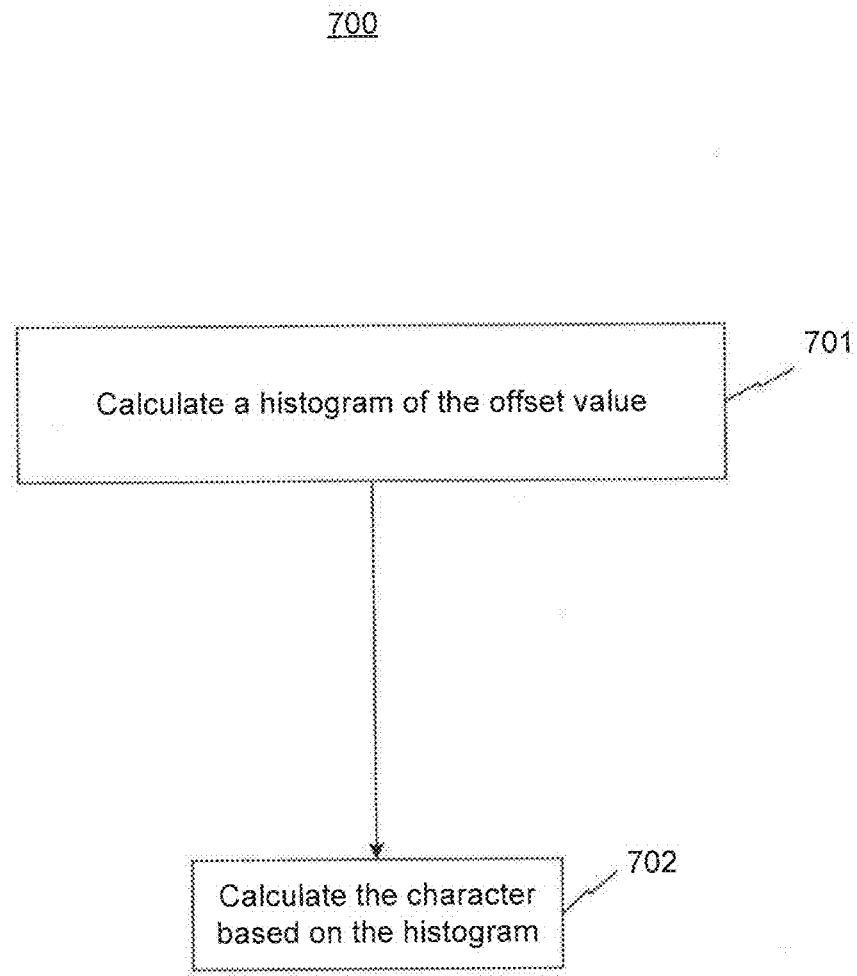
FIG. 7 is a flow diagram illustrating another method for calculating a character, according to an exemplary embodiment.

FIG. 7 is a flow diagram illustrating another method 700 for calculating a character, according to an exemplary embodiment. The steps of method 700 may be performed by the processor 120 of the manufacturing apparatus 100 or the processor 220 of the monitoring apparatus 202.

At step 701, the processor calculates a histogram of the offset value. The histogram may be generated based on a pre-defined number of bins, a pre-defined maximum value, and a pre-defined minimum value. The histogram will be described below with reference to FIGS. 9A-9F.

At step 702, the processor calculates the character based on the histogram. In one example, a histogram is converted to a character vector by representing each vector parameter with a bin value.

Figure 8:
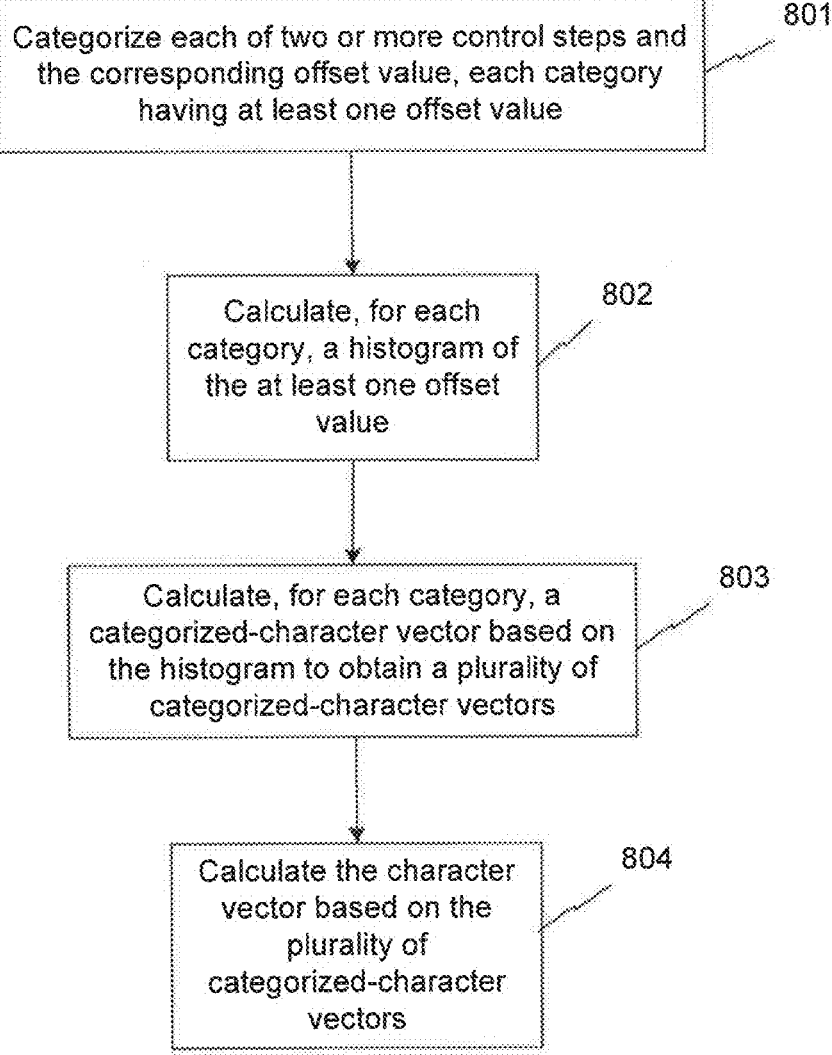
FIG. 8 is a flow diagram illustrating another method for calculating a character, according to an exemplary embodiment.

FIG. 8 is a flow diagram illustrating another method 800 for calculating a character, according to an exemplary embodiment. The steps of method 800 may be performed by the processor 120 of the manufacturing apparatus 100 or the processor 220 of the monitoring apparatus 202.

At step 801, the processor categorizes each of two or more control steps and the corresponding offset values. Each of the categories has at least one offset value. In one example, the categorization may be based on a rate of change of a physical quantity being monitored, applying the categories shown in FIG. 4B.

At step 802, the processor calculates, for each category, a histogram of the at least one offset value. The histogram is generated based on a pre-defined number of bins, a pre-defined maximum value, and a pre-defined minimum value. The histogram will be described below with reference to FIGS. 9A-9F.

At step 803, the processor calculates, for each category, a categorized-character vector based on the histogram to obtain a plurality of categorized-character vectors. In one example, a histogram is converted to a character vector by representing each vector parameter with a bin value.

At step 804, the processor calculates the character vector based on the categorized-character vectors. The calculation may be based on concatenation or weighted average.

FIG. 9A is a flow diagram illustrating another method 900 for calculating a character, and FIGS. 9B-9F are graphical representations, i.e., plots of examples of the method for calculating the character, according to an exemplary embodiment. Step 901 of method 900 corresponds to FIG. 9B, step 902 of method 900 corresponds to FIG. 9C, step 903 of method 900 corresponds to FIG. 9D, and step 904 of method 900 corresponds to FIGS. 9E and 9F.

At step 901, a control signal of a controller and a corresponding sensing signal are collected. FIG. 9B illustrates a plot of the control signal and sensing signal (in arbitrary units) collected in step 901. The signals are represented on the y-axis and the processing time is represented on the x-axis. In this plot, the control signal and sensing signal overlap completely except for regions 911 where the sensing signal displays fluctuation relative to the control signal. The signals are sampled at a sampling rate of 1 point per second, so that, for example, 6000 seconds of processing time represents 6000 sampling points.

At step 902, an offset value is calculated and normalized based on the collected control signal and sensing signal, using the formula described above.

FIG. 9C illustrates the offset value calculated in step 902 plotted against the processing time based on the formula before normalization. The offset value is represented on the y-axis and the processing time is represented on the x-axis.

At step 903, the offset value is adjusted based on a tolerance value. In this embodiment, the tolerance value includes a switch delay. A switch delay can be a time lag between a component receiving instructions and executing the instructions, and may cause deviations between the control signal and the sensing signal.

FIG. 9D illustrates the offset value adjusted in step 903 plotted against the processing time based on the switch delay adjustment. The adjusted offset value is represented on the y-axis and the processing time is represented on the x-axis.

At step 904, histograms are generated based on the adjusted offset value. In one example, a first histogram, as shown in FIG. 9E, is generated for the offset values for a second run. A run may represent a process from inserting a wafer into a machine to removing the wafer. The bin value/number is represented on the y-axis and the number of bins is represented on the x-axis. The first histogram is generated based on a pre-defined number of bins, a pre-defined maximum value, and a pre-defined minimum value. In one example, adjusted offset values for N runs confirmed as normal/healthy runs are collected as described above and are used as a training set. A mean and/or a standard deviation of the adjusted offset values are calculated and used to define bins for a histogram. For example, bin 1 may include all values within (the mean plus/minus) one standard deviation and bin 2 may include all values between (the mean plus/minus) one and two standard deviations. In FIG. 9E, 14310 adjusted offset values of the second run fall in bin 1 and 513 adjusted offset values of the second run fall in bin 2. Similarly, individual histograms for other runs can be produced.

A second histogram, illustrated in FIG. 9F, is generated by combining the individual histograms. In FIG. 9F, histograms for 50 runs are represented. The y-axis represents the number of bins and the x-axis represents the number of runs. Bin values/numbers are represented by light and dark blocks. The blocks vary from the lightest to the darkest in color to represent a range of $10^4$ to $10^0$.

At step 905, a character is calculated. In some embodiments, the character is calculated based on at least one of a histogram, a statistical analysis, or information from a user manual, as described above.

In one example, a character vector, and thus a character, is calculated based on a histogram for each run. Each parameter of the character vector can be represented by bin values/number. The degree of freedom of the character vector can be a number of bins of the histogram. In one embodiment, histogram values of an $i^{th}$ run corresponding to each bin are expressed as a vector, $histogram_i$=[14310, 513, 205, 196, 104, 60, 38, . . . , 0, 0, 0]. By a nonlinear transformation of character=$\log_{10}$(histogram+1), the character of the $i^{th}$ run is calculated as $character_i$=[4.16, 2.71, 2.32, 2.29, 2.02, 1.79, 1.59, . . . , 0, 0, 0].

Figure 10A:
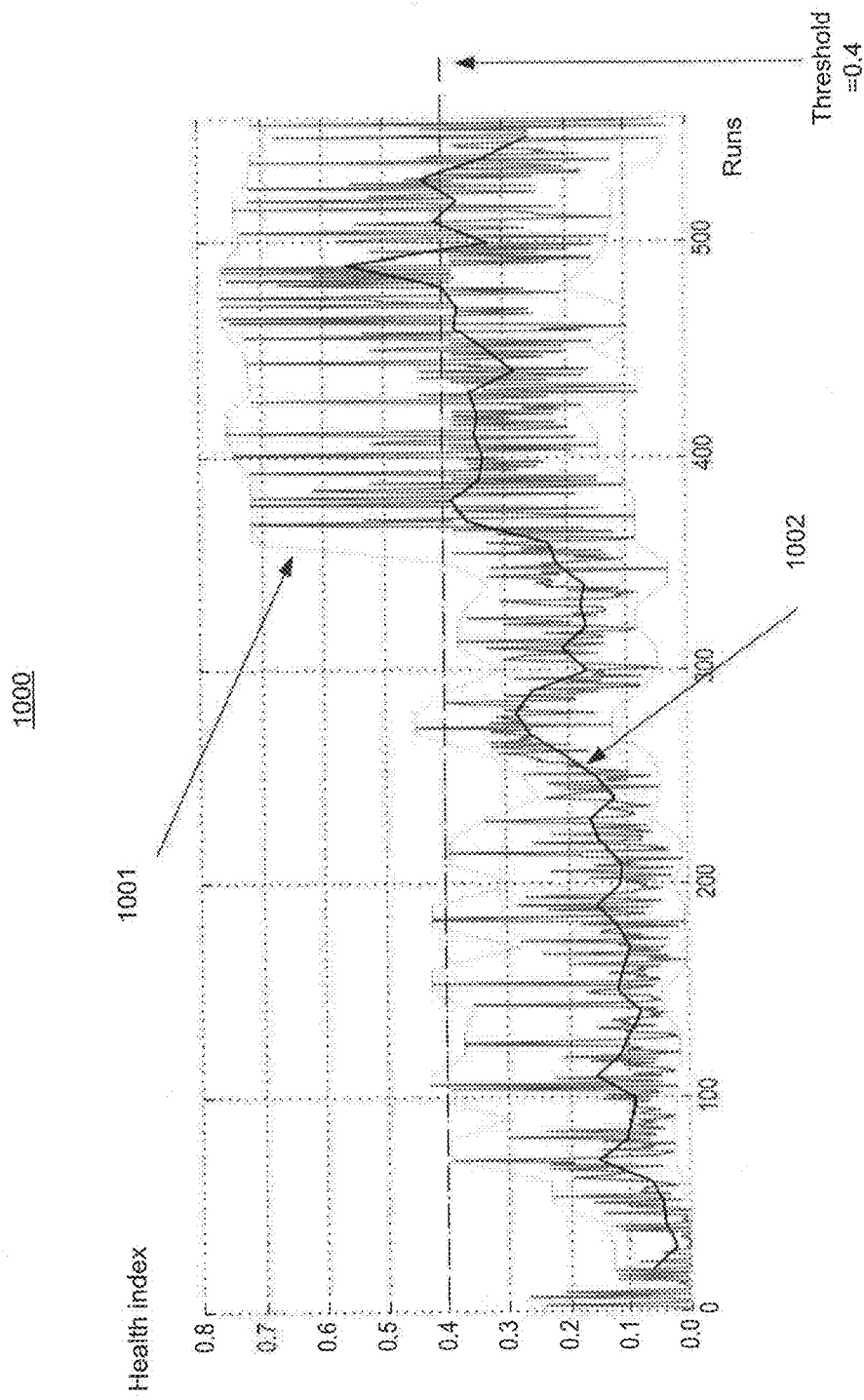
FIG. 10A is a graphical representation of a health index curve, according to an exemplary embodiment.

FIG. 10A is a graphical representation 1000 of an example of a curve of health indices, according to an exemplary embodiment. In one embodiment, the health index has a numerical value.

In this representation, the normalized health index is represented on the y-axis and the number of runs is represented on the x-axis. The health index is calculated by the SOM model from the histogram/character described above and indicates fluctuation within an envelope 1001. A health index curve 1002 is fitted, for example by averaging the health index in neighboring runs, to the health index data. In this presentation, a threshold is determined to be 0.4 and runs corresponding to a fitted health index higher than 0.4 trigger a warning signal.

In some embodiments, the health index is based on a difference between a current character (vector) and a character (vector) at a normal condition. The difference may include a Mahalanobis distance or a Euclidean distance.

FIGS. 10B-10E are graphical representations of another method for determining a health index, according to an exemplary embodiment. FIGS. 10B-10E share the same x-axis (time(sec.)), the total length of which represents 1 run in this example.

FIG. 10B illustrates a control signal plotted for each second on the y-axis. FIG. 10C illustrates a sensing signal plotted for each second on the y-axis. FIG. 10D illustrates a calculated offset value, plotted for each second on the y-axis, from the control and sensing signals, as described above.

In FIG. 10D, a scanning window of a predetermined length, e.g., N=30 points or 30 seconds in this example, is scanned across the x-axis and determines a number of offset values in the window exceeding a predetermined offset value threshold.

In FIG. 10E, sliding window error rates are each calculated as a ratio of the number of offset values in the window exceeding the predetermined offset value threshold to N. In one example, 15 offset values in a window exceed a predetermined offset value threshold of 0.01 and N=30. So the error rate of the window is 15/30=0.5. The calculated error rates are plotted on the x-axis and treated as health indices. The health indices are compared with a predetermined health index threshold as shown in FIG. 10E. Any health index larger than the predetermined health index threshold triggers a warning signal, as described above.

Figure 11A:
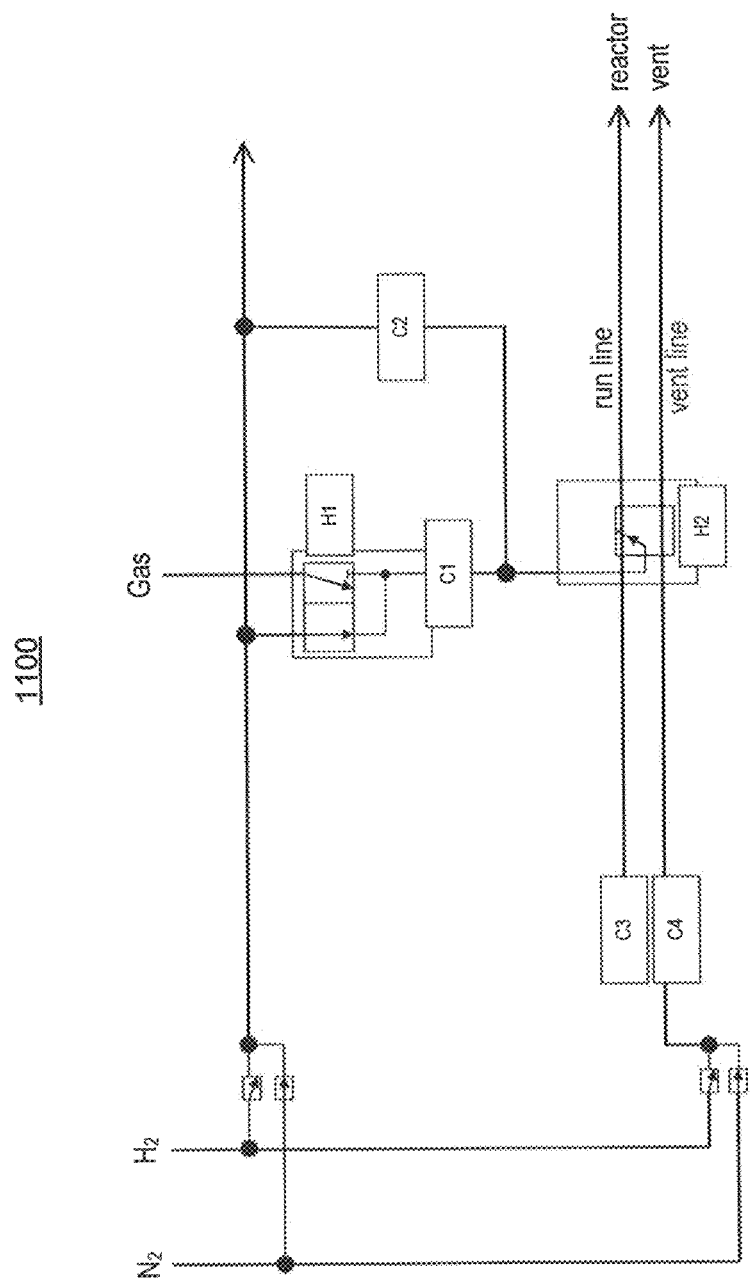
FIG. 11A is a schematic representation of a pipeline network.
Figure 11B:
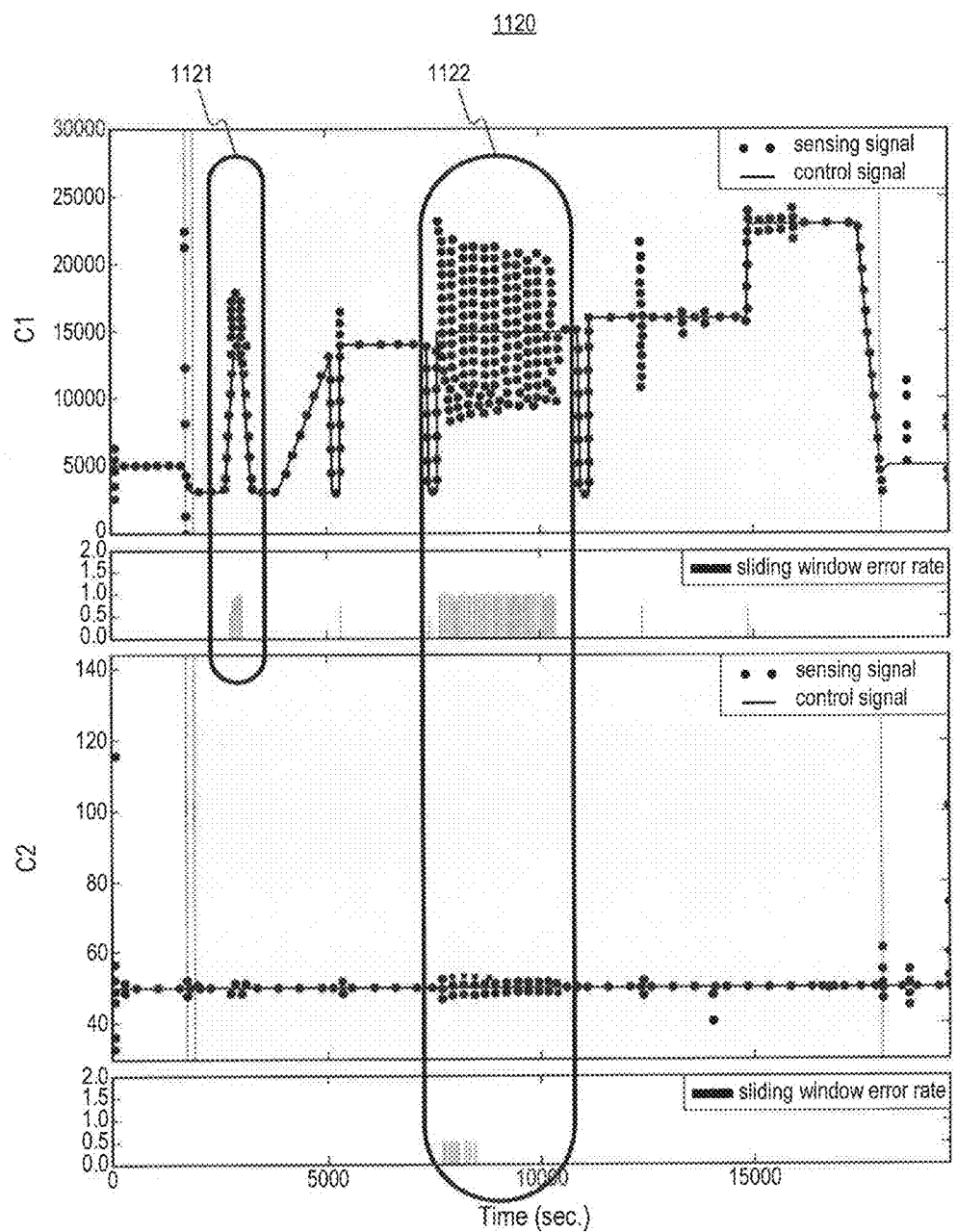
FIGS. 11B-11C are graphical representations of a method for identifying a responsible controller, according to an exemplary embodiment.
Figure 11C:
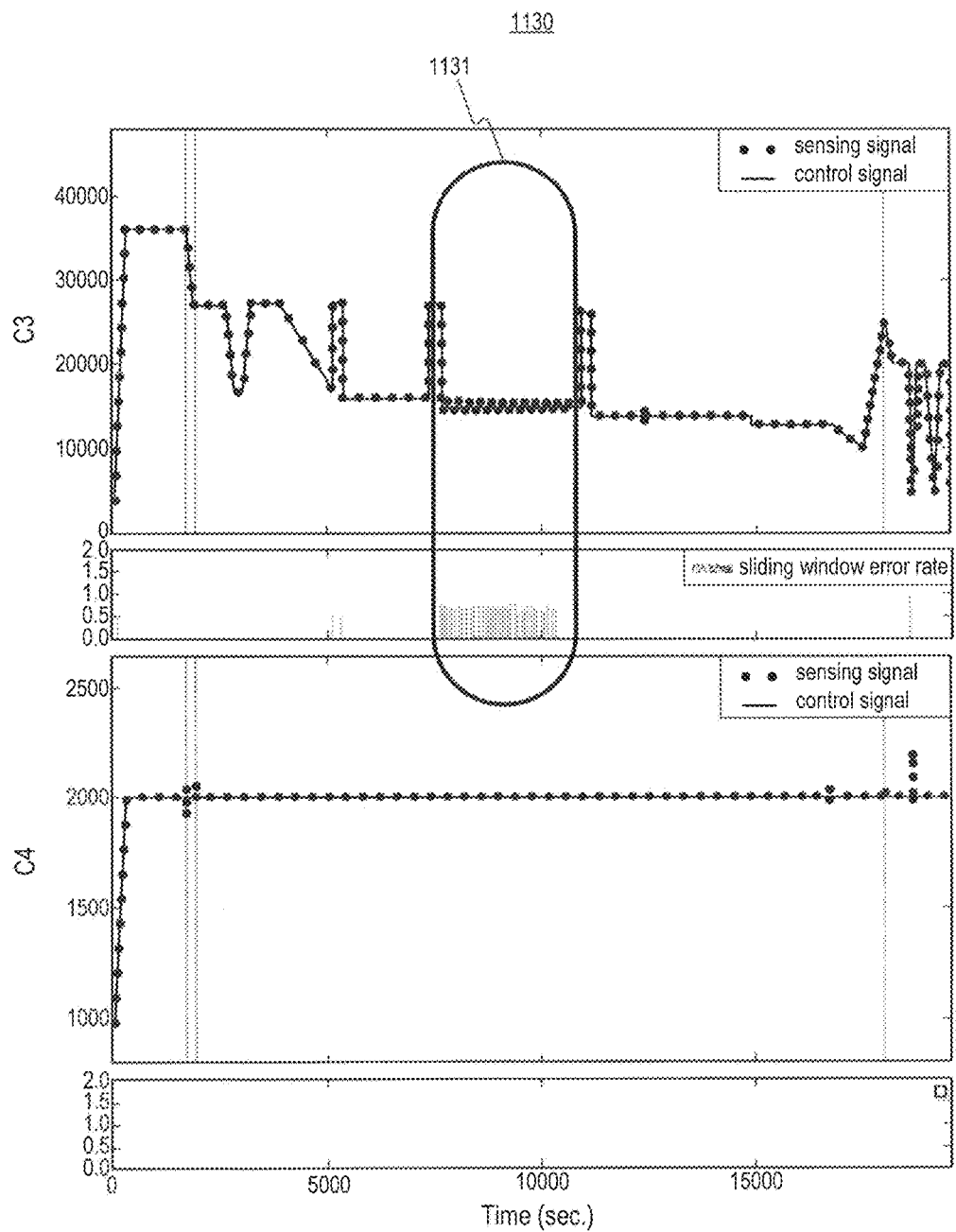

FIGS. 11A-11C are diagrams illustrating a method for identifying a responsible controller, according to an exemplary embodiment.

FIG. 11A is a schematic representation of a pipeline network 1100 including controllers and valves. Pipelines can be labelled by the carrying material composition such as $N_2$ gas or $H_2$ gas, or by functions in reactions such as run line or vent line. A dot represents a connection point for two or more pipelines. The network includes controllers C1, C2, C3, and C4 and valves H1 and H2.

In one example, spatial relations/spatial event analysis among controllers C1 and C2 and valve H2 may include: when valve H2 is switched to a run line as shown in FIG. 11A, controllers C1/C2 may be connected with controller C3 and affect one another; when valve H2 is switched to a vent line, controllers C1/C2 may be connected with controller C4 and affect one another. A temporal event analysis includes observing a first occurrence of abnormality among the controllers.

FIGS. 11B and 11C are graphical representations of signals collected, after H2 is switched to the run line, by simultaneously monitoring controllers C1-C4. The x-axis in each of FIGS. 11B and 11C represents time in seconds and the y-axis represents readings of sensing and control signals or sliding window error rates in arbitrary units. An analysis of the representations helps to identify the controller responsible for causing (itself and) at least one other controller to have at least one health index exceeding the corresponding predetermined threshold.

In one example shown in FIGS. 11B and 11C, controller C1 shows a first occurrence of abnormality (region 1121) before controllers C2 and C3 (regions 1122 and 1131). Based on the spatial and/or temporal event analysis, the processor identifies controller C1 as the responsible controller.

Figure 12:
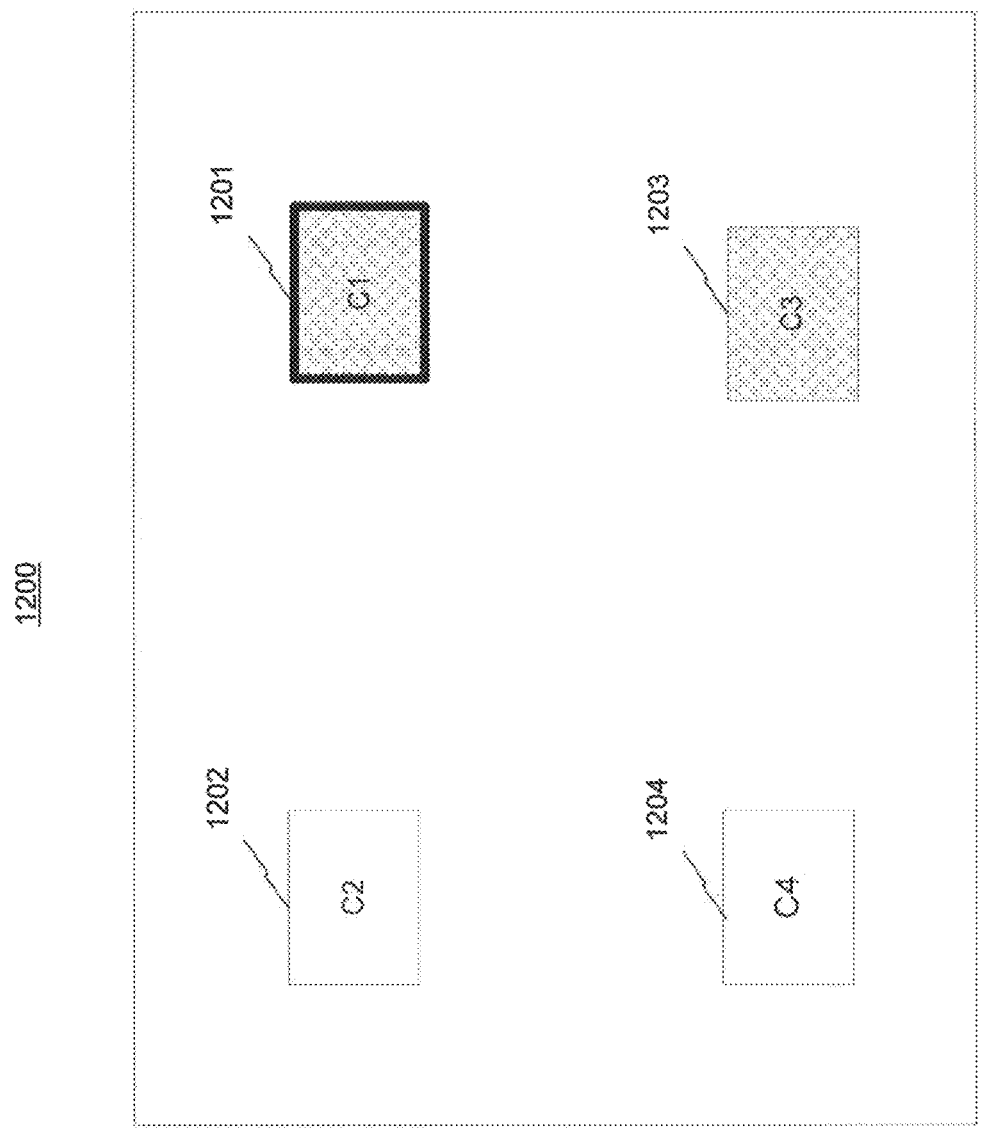
FIG. 12 is a graphical representation of an interface displaying a warning message, according to an exemplary embodiment.

FIG. 12 is a graphical representation 1200 of an interface displaying a warning message, according to an exemplary embodiment. The interface, i.e. the user interface 140 or 240 or the display interface 115, can be a display screen/touchscreen. Health indices of four controllers C1-C4 are correspondingly displayed at display blocks 1201-1204 of the interface. In some embodiments, the health indices of the four controllers are displayed as numerical values. In one example of generating a warning signal, display blocks 1201 and 1203 become shaded, indicating that the displayed health indices correspondingly exceed their predetermined thresholds. The frame of the display block 1201 also becomes highlighted to indicate a responsible controller, according to the methods described above. Other distinguishing methods, such as coloring or bolding, can be used to accentuate the warning message. Display blocks 1202 and 1204 do not show any change in shading or frame, indicating that these two controllers remain at a normal condition. A user monitoring this interface can act accordingly by checking for problems with the controller corresponding to display block 1201.

The specification has described methods, apparatus, and systems for monitoring a manufacturing apparatus. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable storage medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for monitoring a manufacturing apparatus, comprising:
    collecting a control signal, of a controller and a corresponding sensing signal, of the manufacturing apparatus over a predetermined period of time;
    segmenting the control signal and the corresponding sensing signal by categorizing change of the control signal and the corresponding sensing signal in time, to obtain at least one control step;
    calculating a character of the controller based on at least one of the control signal, the sensing signal, the at least one control step, or information from a user manual;
    generating, based on the character, a health index indicating health of the controller; and
    generating a warning signal when the health index exceeds a predetermined threshold.

2. The method of claim 1, wherein:
    the character includes a character vector, and
    calculating the character includes:
        calculating a difference between the control signal and the corresponding sensing signal to obtain an offset value; and
        calculating the character vector based on the obtained offset value.

3. The method of claim 2, wherein:
    the manufacturing apparatus includes at least one valve associated with the controller, and
    calculating the character vector based on the obtained offset value includes adjusting the offset value based on a tolerance value, the tolerance value being pre-defined and including error caused by at least one of a response time of the controller, an inaccuracy of the controller, or an opening/closing time of the at least one valve.

4. The method of claim 2, wherein calculating the character vector includes:
    calculating at least one of a histogram, a mean, a standard deviation, a maximum value, a minimum value, a range, an interquartile range, a skewness, a kurtosis, a rise time, a fall time, a settling time, an overshoot, an undershoot, or a time to peak of the offset value, and
    calculating the character vector based on the at least one of a histogram, a mean, a standard deviation, a maximum value, a minimum value, a range, an interquartile range, a skewness, a kurtosis, a rise time, a fall time, a settling time, an overshoot, an undershoot, or a time to peak.

5. The method of claim 1, wherein:
    the character includes a character vector,
    the at least one control step includes two or more control steps, and
    calculating the character includes:
        calculating a difference between the control signal and the corresponding sensing signal, at each of the two or more control steps, to obtain corresponding offset values; and
        calculating the character vector based on the obtained offset values.

6. The method of claim 5, wherein:
    the manufacturing apparatus includes at least one valve associated with the controller,
    calculating the difference includes calculating the difference based on a tolerance value, the control signal, and the sensing signal, and
    the tolerance value is pre-defined and includes error caused by at least one of a response time of the controller, an inaccuracy of the controller, or an opening/closing time of the at least one valve.

7. The method of claim 5, wherein calculating the character vector further includes:
calculating at least one of a histogram, a mean, a standard deviation, a maximum value, a minimum value, a range, an interquartile range, a skewness, a kurtosis, a rise time, a fall time, a settling time, an overshoot, an undershoot, or a time to peak of the offset value, and
calculating the character vector based on the at least one of a histogram, a mean, a standard deviation, a maximum value, a minimum value, a range, an interquartile range, a skewness, a kurtosis, a rise time, a fall time, a settling time, an overshoot, an undershoot, or a time to peak.

8. The method of claim 5, wherein calculating the character vector includes:
categorizing each of the two or more control steps and the corresponding offset values, each category having at least one offset value;
calculating, for each category, a histogram of the at least one offset value;
calculating, for each category, a categorized-character vector based on the histogram to obtain a plurality of categorized-character vectors; and
calculating the character vector based on the plurality of categorized-character vectors.

9. The method of claim 1, further comprising:
generating a health model for the controller according to the character of the controller at a normal condition; and
determining the predetermined threshold based on the health model.

10. The method of claim 9, wherein generating the health model includes generating the health model based on a self-organizing map (SOM), a restricted Boltzmann machine (RBM), a deep neural network (DNN), an autoencoder, a convolutional RBM, a convolutional DNN, a Hotelling's T-squared statistic, a Q-statistic, a one-class classifier, one-class support vector machine, a support vector data description (SVDD), a fuzzy c-means, a Gaussian mixture model (GMM) model, a k nearest neighbors (kNN), or a sliding window error rate.

11. The method of claim 1, wherein the manufacturing apparatus includes a plurality of controllers and at least one valve associated with the plurality of controllers,
the method further including:
generating health indices each indicating health of a different one of the plurality of controllers; and
identifying, when two or more of the health indices exceed corresponding predetermined thresholds, a responsible controller based on spatial-temporal relations among the plurality of controllers and the at least one valve.

12. The method of claim 11, wherein identifying the responsible controller based on the spatial-temporal relations includes identifying the responsible controller based on relative positions of the plurality of controllers and the at least one valve in a network of connected pipes with respect to flow directions of materials inside the network and closing/opening time of the at least one valve.

13. The method of claim 11, wherein identifying the responsible controller includes identifying one of the plurality of controllers that causes at least one other controller to have at least one health index exceeding the corresponding predetermined threshold.

14. The method of claim 11, wherein identifying the responsible controller includes identifying the responsible controller further based on a multivariable analysis.

15. The method of claim 2, wherein generating the warning signal includes generating the warning signal to include:
a first health index indicating health of the controller at a past time,
a second health index indicating health of the controller at a current time,
the control signal and the sensing signal of the controller, and
the offset value.

16. The method of claim 5, wherein generating the warning signal includes generating the warning signal to include:
a first health index indicating health of the controller at a past time,
a second health index indicating health of the controller at a current time,
the control signal and the sensing signal of the controller, and
the offset values.

17. The method of claim 11, wherein generating the warning signal includes generating the warning signal to include:
a first health index indicating health of the responsible controller at a past time,
a second health index indicating health of the responsible controller at a current time,
the control signal and the sensing signal of the responsible controller, and
a temporal and spatial event analysis result among the plurality of controllers including the responsible controller and the at least one valve.

18. The method of claim 1, further comprising:
displaying a warning message on a display interface of the manufacturing apparatus based on the warning signal.

19. The method of claim 1, further comprising:
transmitting the warning signal to a monitoring apparatus; and
displaying a warning message based on the warning signal on a user interface of the monitoring apparatus.

20. A manufacturing system, comprising:
a manufacturing apparatus including a controller; and
a monitoring apparatus including:
a processor; and
a memory storing instructions that, when executed by the processor, cause the processor to:
collect a control signal of the controller, and a corresponding sensing signal, over a predetermined period of time;
segment the control signal and the corresponding sensing signal by categorizing change of the control signal and the corresponding sensing signal in time, to obtain at least one control step;
calculate a character of the controller based on at least one of the control signal, the sensing signal, the at least one control step, or information from a user manual;
generate, based on the character, a health index indicating health of the controller; and
generate a warning signal when the health index exceeds a predetermined threshold.

21. The system of claim 20, wherein:

the manufacturing apparatus includes a plurality of controllers and at least one valve associated with the plurality of controllers, and the instructions further cause the processor to:

generate health indices each indicating health of a different one of the plurality of controllers; and identify, when two or more of the health indices exceed corresponding predetermined thresholds, a responsible controller based on spatial-temporal relations among the plurality of controllers and the at least one valve.

22. An apparatus for monitoring a manufacturing apparatus, comprising:

a processor; and a memory storing instructions that, when executed by the processor, cause the processor to:

collect a control signal of a controller, and a corresponding sensing signal, of the manufacturing apparatus over a predetermined period of time;

segment the control signal and the corresponding sensing signal by categorizing change of the control signal and the corresponding sensing signal in time, to obtain at least one control step;

calculate a character of the controller based on at least one of the control signal, the sensing signal, the at least one control step, or information from a user manual;

generate, based on the character, a health index indicating health of the controller; and generate a warning signal when the health index exceeds a predetermined threshold.

23. The apparatus of claim 22, wherein:

the manufacturing apparatus includes a plurality of controllers and at least one valve associated with the plurality of controllers, and the instructions further cause the processor to:

generate health indices each indicating health of a different one of the plurality of controllers; and identify, when two or more of the health indices exceed corresponding predetermined thresholds, a responsible controller based on spatial-temporal relations among the plurality of controllers and the at least one valve.

24. A non-transitory computer-readable storage medium embodying a computer program product, the computer program product comprising instructions configured to cause a computing device to perform a method comprising:

collecting a control signal of a controller, and a corresponding sensing signal, of a manufacturing apparatus over a predetermined period of time;

segmenting the control signal and the corresponding sensing signal by categorizing change of the control signal and the corresponding sensing signal in time, to obtain at least one control step;

calculating a character of the controller based on at least one of the control signal, the sensing signal, the at least one control step, or information from a user manual;

generating, based on the character, a health index indicating health of the controller; and generating a warning signal when the health index exceeds a predetermined threshold.

25. The non-transitory computer-readable storage medium of claim 24, wherein:

the manufacturing apparatus includes a plurality of controllers and at least one valve associated with the plurality of controllers, and the instructions are configured to cause the computing device to perform a method further comprising:

generating health indices each indicating health of a different one of the plurality of controllers; and identifying, when two or more of the health indices exceed corresponding predetermined thresholds, a responsible controller based on spatial-temporal relations among the plurality of controllers and the at least one valve.

* * * * *